United States Patent
Sugaya et al.

(10) Patent No.: US 7,085,474 B2
(45) Date of Patent: Aug. 1, 2006

(54) WATERMARK DETECTING APPARATUS

(75) Inventors: Kazumi Sugaya, Tokorozawa (JP); Hiroshi Iwamura, Tokorozawa (JP); Hidejiro Higashi, Tokorozawa (JP); Keiji Katata, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 1069 days.

(21) Appl. No.: 09/848,501

(22) Filed: May 4, 2001

(65) Prior Publication Data

US 2002/0031221 A1 Mar. 14, 2002

(30) Foreign Application Priority Data

May 12, 2000 (JP) ............................. 2000-140290

(51) Int. Cl.
*G11B 15/04* (2006.01)
*H04N 7/167* (2006.01)
*H04N 11/00* (2006.01)
*H04N 5/91* (2006.01)

(52) U.S. Cl. .................. 386/94; 386/1; 386/6; 386/68; 386/94; 386/81; 386/82; 360/60; 380/201; 380/202; 380/203

(58) Field of Classification Search ............... 386/1, 386/6, 68, 81–82, 94; 360/60; 380/201–203; 382/100; 705/57–58; 713/161, 182, 193; H04N 5/76, H04N 5/781, 9/79
See application file for complete search history.

(56) References Cited

U.S. PATENT DOCUMENTS

| 5,729,516 | A |   | 3/1998 | Tozaki et al. |
| 6,108,434 | A | * | 8/2000 | Cox et al. .................. 382/100 |
| 6,674,874 | B1 | * | 1/2004 | Yoshida et al. ............. 382/100 |
| 6,700,989 | B1 | * | 3/2004 | Itoh et al. .................. 382/100 |
| 6,738,493 | B1 | * | 5/2004 | Cox et al. .................. 382/100 |

FOREIGN PATENT DOCUMENTS

| GB | 2328579 A | 2/1999 |
| WO | WO 00/04722 A1 | 1/2000 |

OTHER PUBLICATIONS

Ton Kalker et al.; Efficient Detection of a Spatial Spread-Spectrum Watermark in MPEG Video Streams; vol. 1.; Sep. 2000.

* cited by examiner

*Primary Examiner*—Thai Tran
*Assistant Examiner*—Jamie Vent
(74) *Attorney, Agent, or Firm*—Sughrue Mion, PLLC (57) ABSTRACT

An information detecting apparatus which can surely detect specific information such as a digital watermark in high-speed data stream and can be configured at low cost. The apparatus extracts data including specific information from a high-speed data stream, and detects the specific information in the extracted data at low speed.

1 Claim, 9 Drawing Sheets

WATERMARK DETECTING APPARATUS

BACKGROUND OF THE INVENTION

1. Field of the Invention

The present invention relates to an apparatus for detecting specific information such as a digital watermark in a high-speed data stream including data in which the specific information is embedded.

2. Description of the Related Background Art

It is necessary to prevent illegal copy of recorded information such as image information recorded on an optical recording medium such as a DVD. Recently, much attention has been paid to technology for transmitting image data in which a so-called digital watermark is embedded, or for recording the image data on a recording medium. The digital watermark is an inconspicuous image pattern like a small noise component, which indicates information such as copyright information and copy guard.

Since a high-speed data stream such as an MPEG data stream obtained by reading information recorded on for example, a DVD includes a digital watermark component, all the high-speed data stream is processed in real time by a watermark information detecting apparatus to detect the digital watermark component.

A conventional watermark information detecting apparatus necessarily includes a high-speed parser for analyzing the data configuration of a high-speed data stream at high speed, and a high-speed watermark detector for detecting watermark information from a predetermined part of the data configuration analyzed by the high-speed parser.

Recently, a DVD-ROM drive has been used as an external storage device for personal computers. The DVD-ROM drive can usually read recorded information from a disc at high speed which is for example, eight times as fast as the normal speed. In the high-speed DVD-ROM drive, the output speed of a data stream which is read becomes much faster, so that it becomes more difficult to process watermark information by a watermark information detecting apparatus in real time. In addition, if a high-speed watermark decoder for the faster data stream is disposed in the watermark information detecting apparatus, the apparatus will become more expensive.

SUMMARY OF THE INVENTION

It is therefore an object of the present invention to provide an information detecting apparatus which can surely detect specific information such as a digital watermark from a high-speed data stream and can be configured at low cost.

The information detecting apparatus according to the present invention comprises an extractor for extracting data including specific information from a high-speed data stream, and a detector for detecting at low speed the specific information in the data extracted by the extractor.

DETAILED DESCRIPTION OF THE PREFERRED EMBODIMENTS

Embodiments of the present invention will now be described in detail hereinafter with reference to the accompanying drawings.

Figure 1:
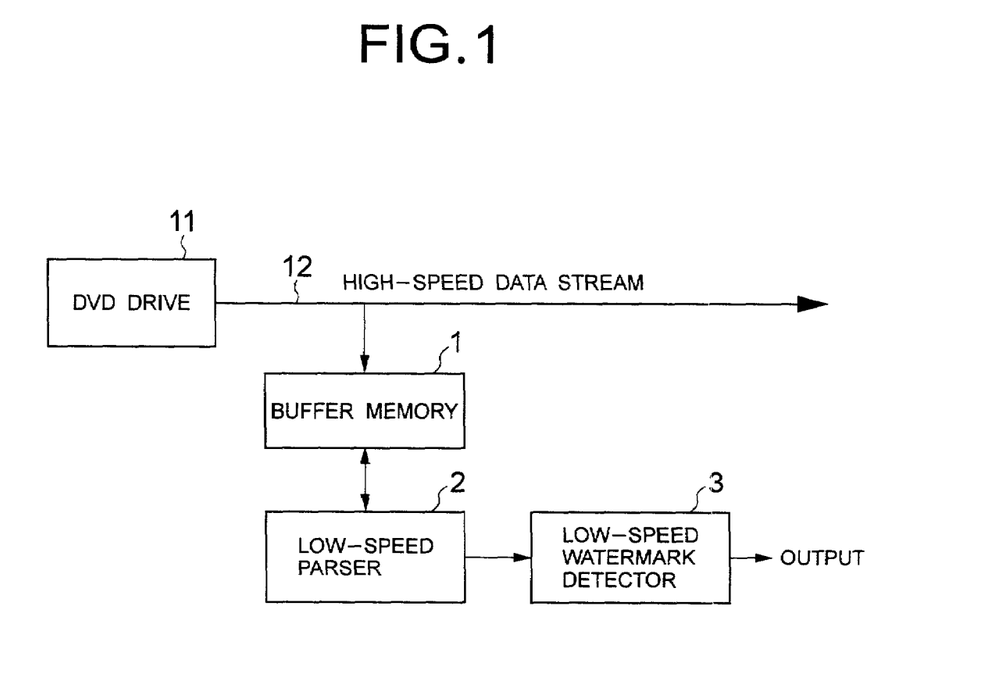
FIG. 1 is a block diagram of the configuration of a watermark information detecting apparatus according to the present invention.

FIG. 1 is the configuration of a watermark information detecting apparatus according to the present invention. The watermark information detecting apparatus includes a buffer memory 1, a low-speed parser 2, and a low-speed watermark detector 3. The buffer memory 1 is connected to a bus line 12 to which a high-speed data stream read from a DVD by a DVD drive 11 is output. In the case, a data stream coded by using the MPEG system is output as a high-speed data stream. The buffer memory 1 can store data more than 1 GOP (Group Of Pictures), for example.

The low-speed parser 2 analyzes the structure of data stored in the buffer memory 1 to extract picture data of I picture as described below, and stores the picture data of I picture in an internal memory (not shown).

The low-speed watermark detector 3 detects a digital watermark in the picture data of I picture detected by the low-speed parser 2.

Picture data of I picture itself forms one screen image and a digital watermark exists in one screen image. If the picture data of I picture is used for watermark detection, the watermark can be detected surely.

Figure 2A:
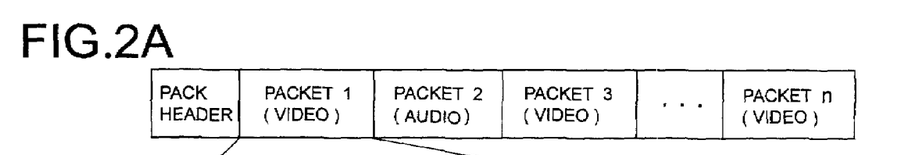
FIGS. 2A–2F illustrate the configuration of an MPEG format.
Figure 2B:
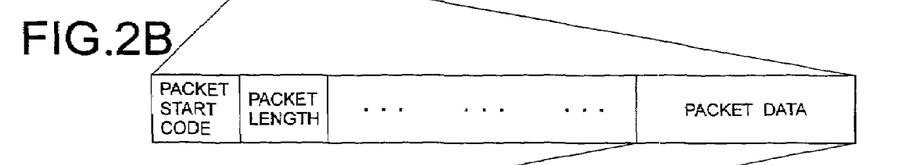
Figure 2C:
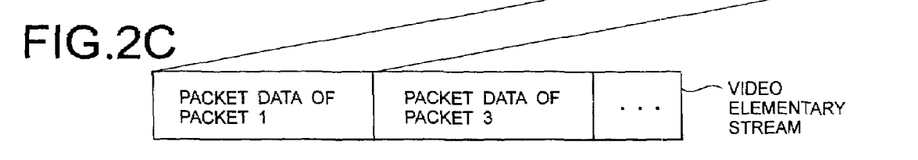

A high-speed data stream of the MPEG system output from the DVD drive 11 has the format as shown in FIG. 2A. One pack consists of n number of packets, and has a pack header arranged at the head thereof. In the packets, video packets (packet 1, packet 3, . . . ) including video information and audio packets (packet 2, . . . ) including audio information are arranged alternately. As shown in FIG. 2B, packet information, such as a packet start code and a packet length, is arranged in a video packet, followed by packet data which is the main frame of video information. When the packet start code is 000001E0 in hexadecimal, the packet data is video information. Packet data of consecutive video packets (packet 1, packet 3, . . . ) form a video elementary stream as shown in FIG. 2C. The video elementary stream is an essential stream including video information only. The video elementary stream is restored when video information is reproduced.

Figure 2D:
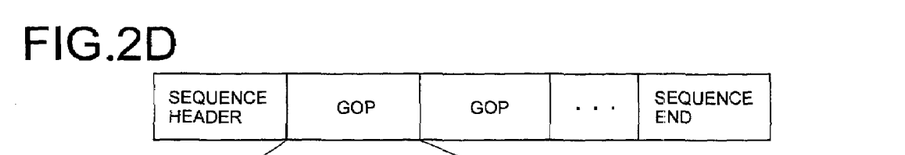
Figure 2E:
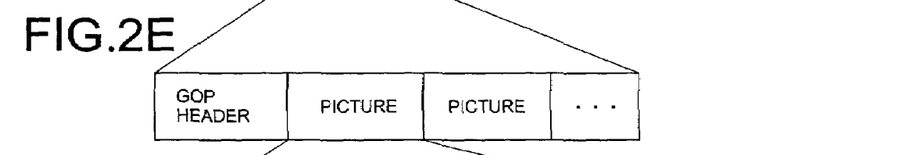
Figure 2F:
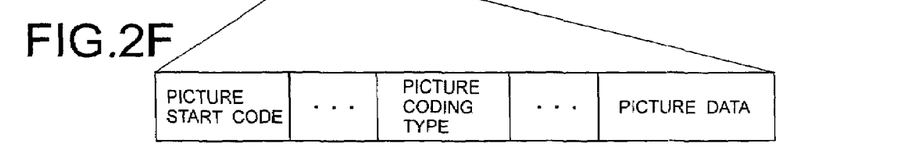

The structure of the video elementary stream as video information starts with a sequence header and ends with a sequence end, as shown in FIG. 2D. An image data group consisting of a plurality of screen images (for example, 15 screen images), which is called a GOP, is arranged between the sequence header and the sequence end. That is, in each GOP, as shown in FIG. 2E, a GOP header is arranged at the head thereof, followed by a plurality of units called pictures arranged consecutively. In each of the pictures, as shown in FIG. 2F, a picture start code is arranged at the head thereof, followed by a picture coding type, and lastly by picture data.

The picture coding type indicates the coding mode of a corresponding picture. The type of each picture is indicated by the picture coding type, namely, whether it is intra-coded image data (I picture), forward predictive-coded image data (P picture), or bidirectionally predictive-coded image data (B picture). Picture data with a picture start code of 00000100 in hexadecimal and a picture coding type of 001 in binary is I picture.

Figure 3:
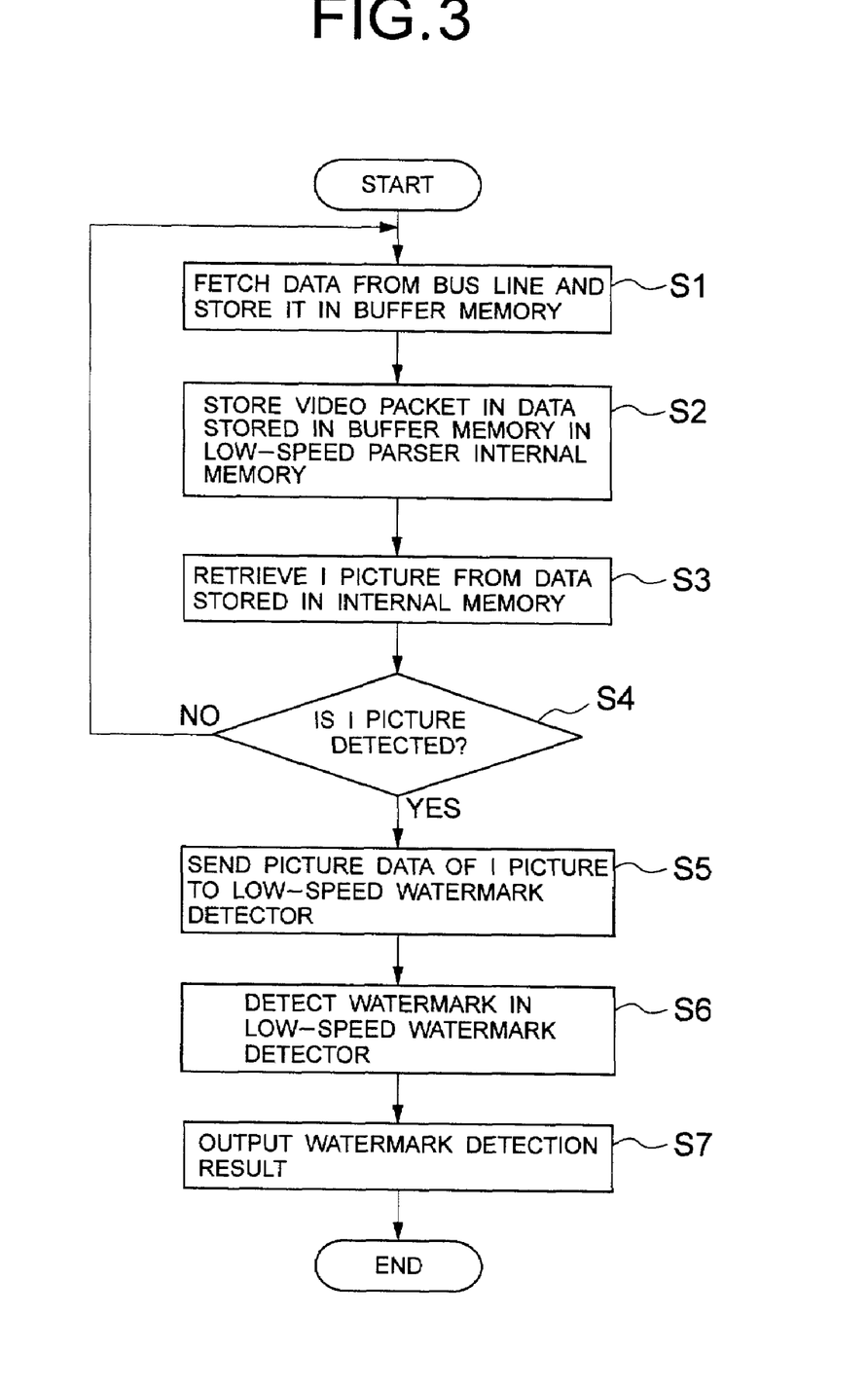
FIG. 3 is a flowchart of the operation of the watermark information detecting apparatus in FIG. 1.

When a high-speed data stream having the configuration as shown in FIG. 2A is supplied to the bus line 12, the buffer memory 1 accepts the data from the bus line 12 and stores the accepted data therein as shown in FIG. 3 (step S1). The quantity to be stored is, as described above, the amount of data for more than one GOP. The low-speed parser 2 extracts a video packet from the data stored in the buffer memory 1, and stores packet data in the extracted packet in an internal memory (step S2). Packet data in each packet which satisfies that the packet start code is 000001E0 in hexadecimal is stored in the internal memory. The data with the configuration of the video elementary stream shown in FIG. 2C or FIG. 2D are stored in the internal memory. The low-speed parser 2 retrieves picture data of I picture from the data stored in the internal memory (step S3), and discriminates whether or not the picture data of I picture is detected (step S4). The low-speed parser 2 retrieves a picture which satisfies the picture start code is 00000100 in hexadecimal and the picture coding type is 001 in binary. Since the picture data included in the retrieved picture indicates an I picture type, the low-speed parser 2 fetches the picture data, and supplies the picture data to the low-speed watermark detector 3 (step S5).

The low-speed watermark detector 3 performs detecting operation for a desired watermark based on the supplied picture data of I picture (step S6), and outputs a result of the detecting operation (step S7).

Figure 4:
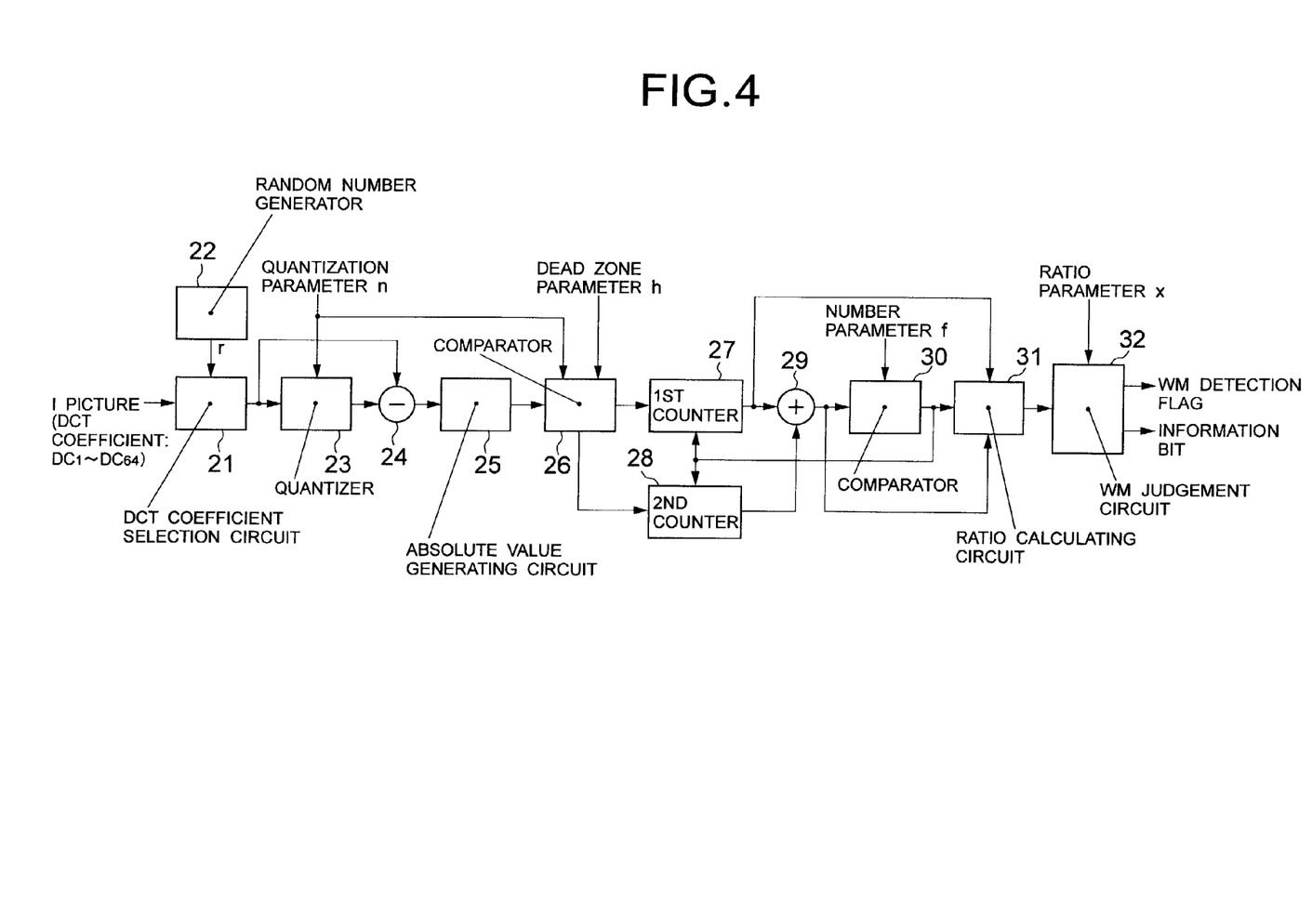
FIG. 4 is a block diagram of the configuration of a low-speed watermark detector.

The specific configuration of the low-speed watermark detector 3 is shown in FIG. 4.

The output of the low-speed parser 2 is supplied to a DCT coefficient selection circuit 21 in the low-speed watermark detector 3 as shown in FIG. 4. A random number generator 22 generates a random number r in the range of "1" to "64" for every one-pixel data block consisting of 8×8 pixel data and supplies it to the DCT coefficient selection circuit 21. The random number generator 22 generates the random number r using the same random-number generation algorithm as that of a random number generator used for mixing the watermark into MPEG data.

Figure 5A:
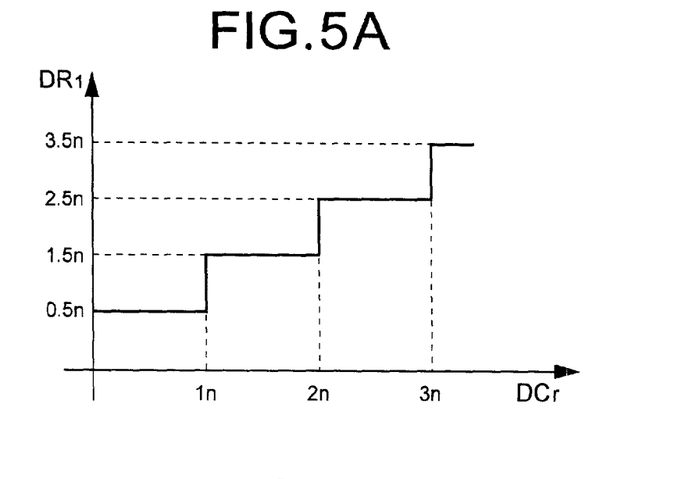
FIGS. 5A–5C are diagrams of the quantization rule.

The DCT coefficient selection circuit 21 selects at least one DCT coefficient DCr, which is a degree indicated by the random number r, of DCT coefficients $DC_1$–$DC_{64}$ which are picture data of I picture supplied from the low-speed parser 2, and supplies it to a quantizer 23 and a subtracter 24. The quantizer 23 quantizes the DCT coefficient DCr in accordance with the quantization rule as shown in FIG. 5A, and supplies the quantized DCT coefficient DR obtained at this time to the subtracter 24. That is, the quantizer 23 quantizes the value of a DCT coefficient DCr, which is in the range of [k·n] or more and below [(k+1)·n], to a quantized DCT coefficient DR having a value of (k+1/2)·n, and supplies it to the subtracter 24. In the above description, n indicates a quantization parameter, and k indicates an integer.

The subtracter 24 obtains a quantized noise value by using the difference between the quantized DCT coefficient DR and the DCT coefficient DCr, and supplies it to an absolute value generating circuit 25. The absolute value generating circuit 25 supplies the absolute value of the quantized noise value to a first comparator 26.

When the absolute value of the quantized noise value is smaller than the lower limit of the area indicated by the dead zone parameter h, the first comparator 26 temporarily discriminates that the watermark mixed into the picture data of I picture is a watermark WM1, and supplies a count-up signal U1 to a first counter 27. When the absolute value of the quantized noise value is larger than the upper limit of the area indicated by the dead zone parameter h, the first comparator 26 temporarily discriminates that the watermark mixed into the picture data is a watermark WM2, and supplies a count-up signal U2 to a second counter 28.

Figure 6:
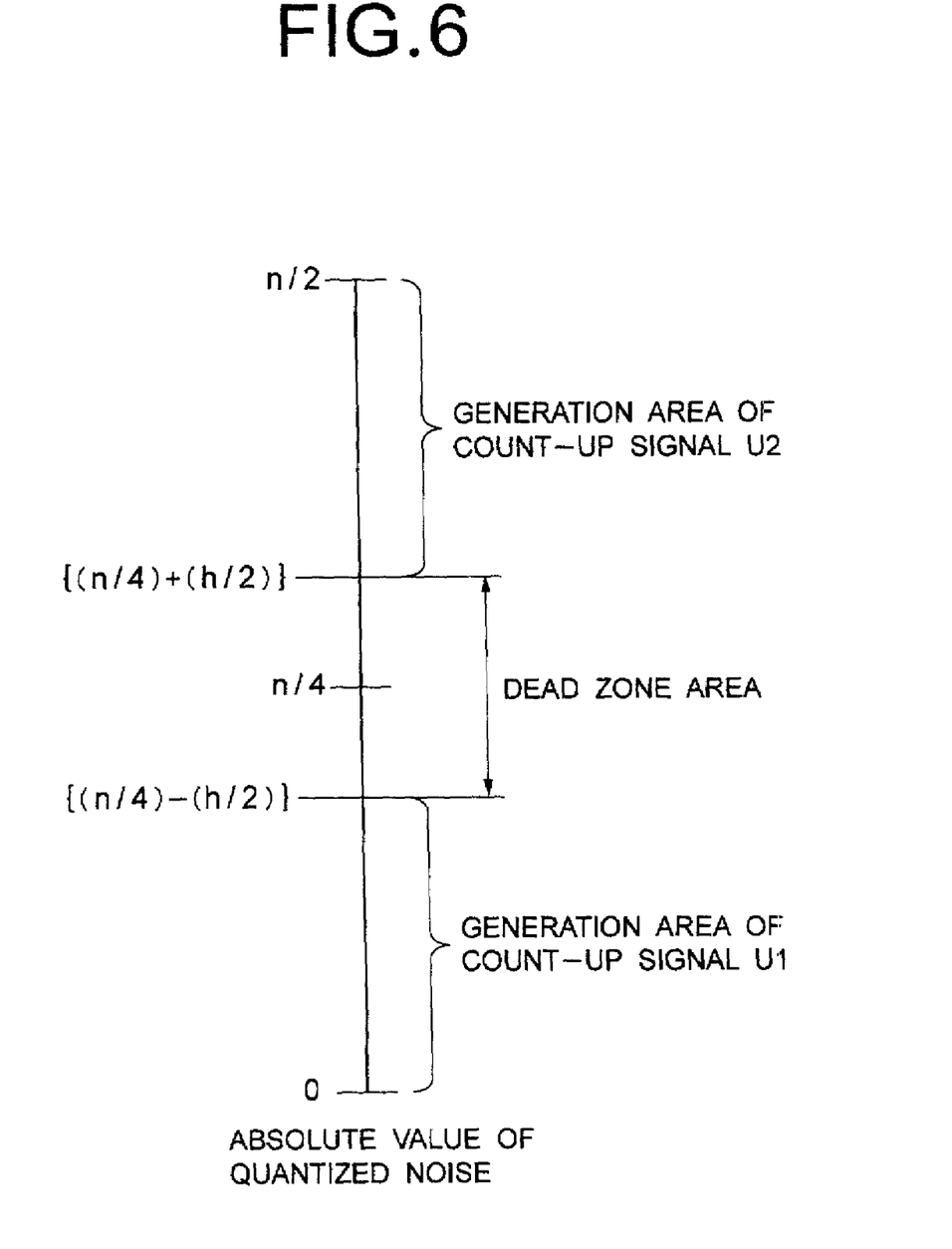
FIG. 6 shows the absolute value of quantized noise and a mutual relationship between a dead zone and a generation zone of each count-up signal U1 and U2.

FIG. 6 is a diagram of the absolute value of the quantized noise and the mutual relationship between the dead zone and the count-up signals U1 and U2.

As is shown in FIG. 6, the upper limit and lower limit of the dead zone become as follows:

Upper limit=$[(n/4)+(h/2)]$

Lower limit=$[(n/4)-(h/2)]$ where n: quantization parameter
h: dead zone parameter The first counter 27 increases the count value by one count every time the count-up signal U1 is supplied, and supplies the count value as C1 to an adder 29 and a ratio calculating circuit 31. When a reset signal RS is supplied from a second comparator 30 as described below, the first counter 27 resets the count value C1 to "0".

The second counter 28 increases the count value by one count whenever the count-up signal U2 is supplied from the first comparator 26, and supplies the count value as C2 to the adder 29. When a reset signal RS is supplied from the second comparator 30, the first counter 27 resets the count value C2 to "0".

The adder 29 adds the count values C1 and C2 and supplies a result of the addition, i.e., (C1+C2) to the second comparator 30 and the ratio calculating circuit 31.

When the added result (C1+C2) becomes equal to a predetermined number parameter f, the second comparator 30 generates a reset signal RS and supplies it to the first counter 27, the second counter 28, and the ratio calculating circuit 31.

The ratio calculating circuit 31 obtains a ratio H of the count value C1 to the added result (C1+C2) in response to the reset signal RS by using the following equation and supplies it to a WM (watermark) judgment circuit 32:

Ratio $H=C1/(C1+C2)$

When the ratio H is the value of a predetermined ratio parameter x or more, the WM judgement circuit 32 outputs a WM detection flag of the logical level "1" indicating that a watermark is mixed into the picture data of I picture. At the time, the WM judgement circuit 32 also outputs an information bit of the logical level "0" indicating that the watermark mixed into the picture data is the watermark WM1. When the value of the ratio H is equal to or less than (1−ratio parameter x), the WM judgement circuit 32 outputs a WM detection flag of the logical level "1" indicating that a watermark is mixed into the picture data of I picture, and also outputs an information bit of the logical level "1" indicating that the watermark mixed into the picture data is the watermark WM2. For example, if these watermarks were used for controlling copying, the rule might be that the watermark WM1 is for "no copying" and the watermark WM2 is for "free copying".

When the ratio H does not correspond to any of the conditions described above, the WM judgement circuit 32 outputs a WM detection flag of the logical level "0" indicating that no watermark is mixed into the picture data of I picture.

The operation of the low-speed watermark detector shown in FIG. 4 will be described below.

First, by the configuration including the DCT coefficient selection circuit 21 and the random number generator 22, at least one DCT coefficient DCr is selected at random from the 64 DCT coefficients $DC_1$–$DC_{64}$. The DCT coefficient DCr selected by the DCT coefficient selection circuit 21 is a quantized DCT coefficient quantized in a watermark mixing device (not shown).

Figure 5B:
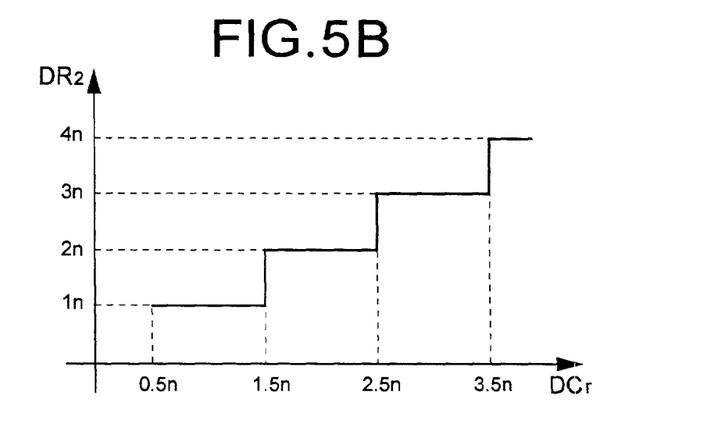
Figure 5C:
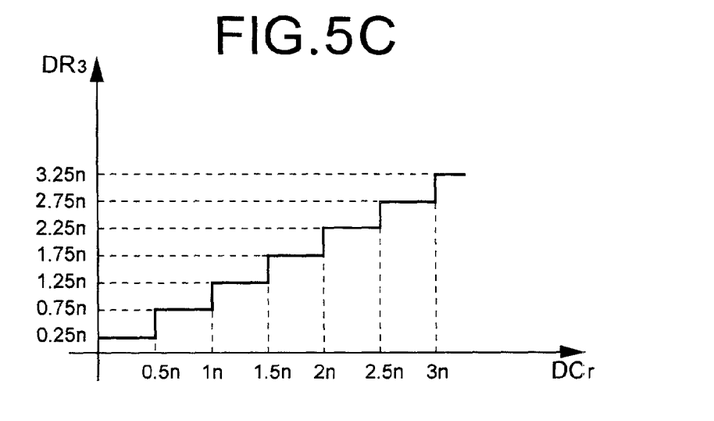

With the configuration including the quantizer 23, subtracter 24, and absolute value generating circuit 25, the DCT coefficient DCr is then quantized in accordance with the quantization rule as shown in FIG. 5A, and the absolute value of a quantization error caused by the quantization is obtained. If the DCT coefficient DCr has been quantized in accordance with the quantization rule as shown in FIG. 5A, the absolute value of the quantization error obtained by using the quantized DCT coefficient becomes a value near "0". If the DCT coefficient DCr has been quantized in accordance with the quantization rule as shown in FIG. 5B, the absolute value of the quantization error becomes a value near "n/2". If the DCT coefficient DCr has been quantized in accordance with the quantization rule as shown in FIG. 5C, the absolute value of the quantization error becomes a value near "n/4".

The first comparator 26 temporarily decides the type of the watermark mixed into the picture data, namely, either it is the watermark WM1 or the watermark WM2, by comparing the absolute value of the quantization error with the above-mentioned values "0" and "n/2", and by judging which value it is nearer to. In order to perform the comparison and judgment, the first comparator 26 uses the upper and lower limits of the dead zone as shown in FIG. 6 as threshold values. The threshold values are used for preventing that, when the absolute value of the quantization error is a value near "n/4", which is a median value of "0" and "n/2", namely, a value far apart from both "0" and "n/2", the reliability of the absolute value is regarded as low as data for judging it either as "0" or "n/2". That is, at the time the type of a watermark is temporarily discriminated based on the absolute value of a quantization error, if the absolute value of that quantization error is within the dead zone, the absolute value is excluded from the judging.

In the above embodiment, the low-speed parser 2 extracts only video packets from the buffer memory 1, stores them in an internal memory, and supplies the picture data of I picture to the low-speed watermark detector 3. However, the low-speed parser 2 may be configured so as to extract the picture data of I picture directly from the buffer memory 1 and supply it to the low-speed watermark detector 3.

Figure 7:
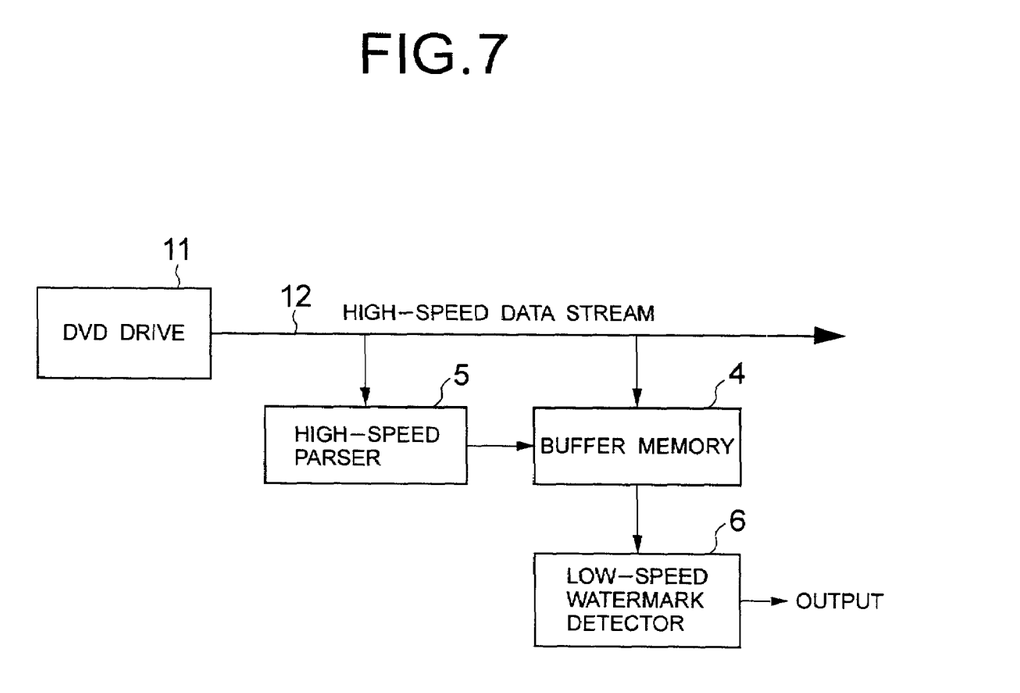
FIG. 7 is a block diagram of the configuration of another watermark information detecting apparatus according to the present invention.

FIG. 7 shows another embodiment of the present invention. The watermark information detecting apparatus in FIG. 7 includes a buffer memory 4, a high-speed parser 5, and a low-speed watermark detector 6. The buffer memory 4 and the high-speed parser 5 are connected to the bus line 12 to which a high-speed data stream read out from a DVD by the DVD drive 11 shown in FIG. 1 is output. The buffer memory 4 holds the picture data of I picture.

The high-speed parser 5 detects picture data of I picture in the high-speed data stream from the bus line 12, and at the time of the detection, the picture data of I picture is stored in the buffer memory 4.

The low-speed watermark detector 6 detects a watermark, which is a digital watermark, in the picture data of I picture stored in the buffer memory 4 in the same way as the low-speed watermark detector 3 in FIG. 1.

Figure 8:
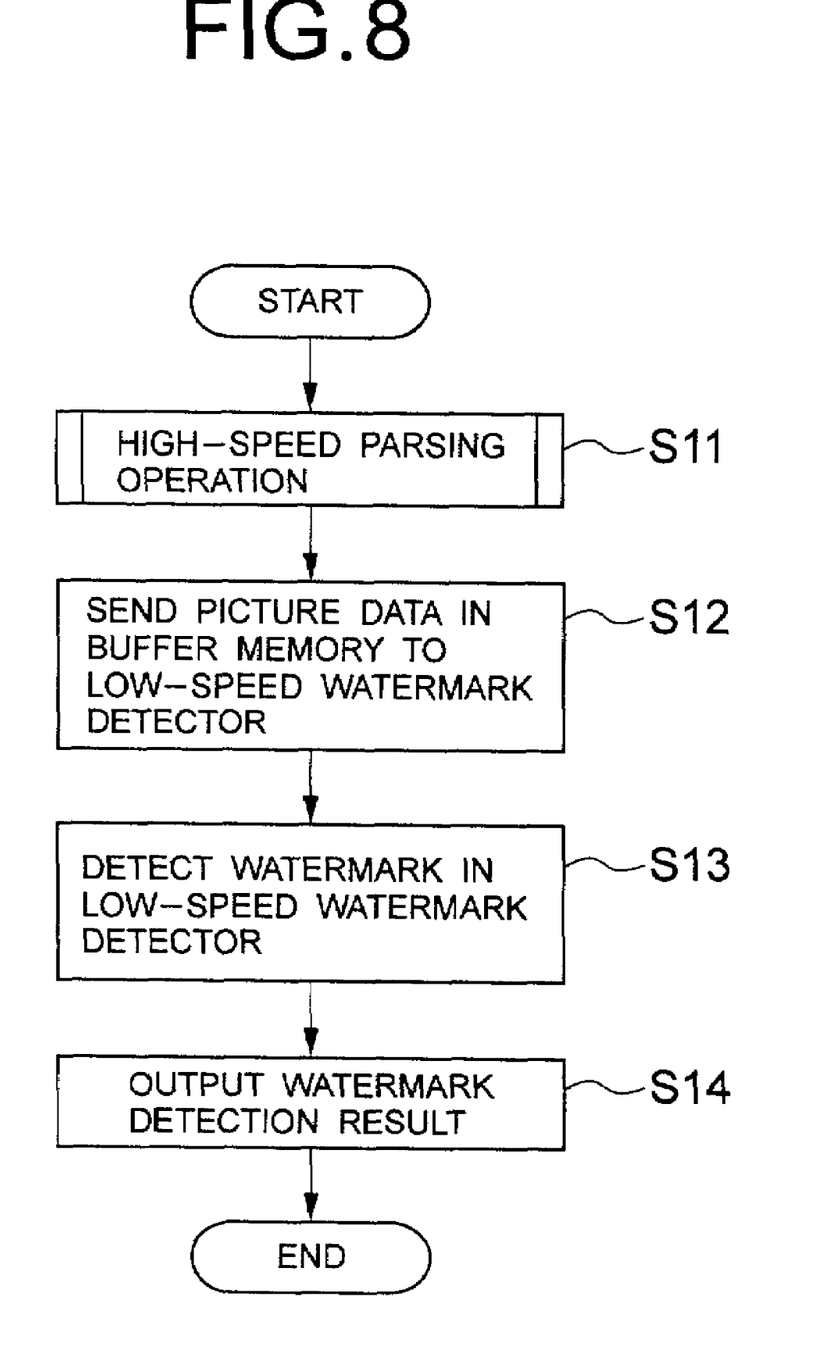
FIG. 8 is a flowchart of the operation of the detecting apparatus in FIG. 7.

In the operation of a watermark information detecting apparatus having the above configuration, the high-speed parser 5 detects picture data of I picture in the high-speed data stream and causes the picture data of I picture to be stored in the buffer memory 4 (step S11), as shown in FIG. 8.

Figure 9:
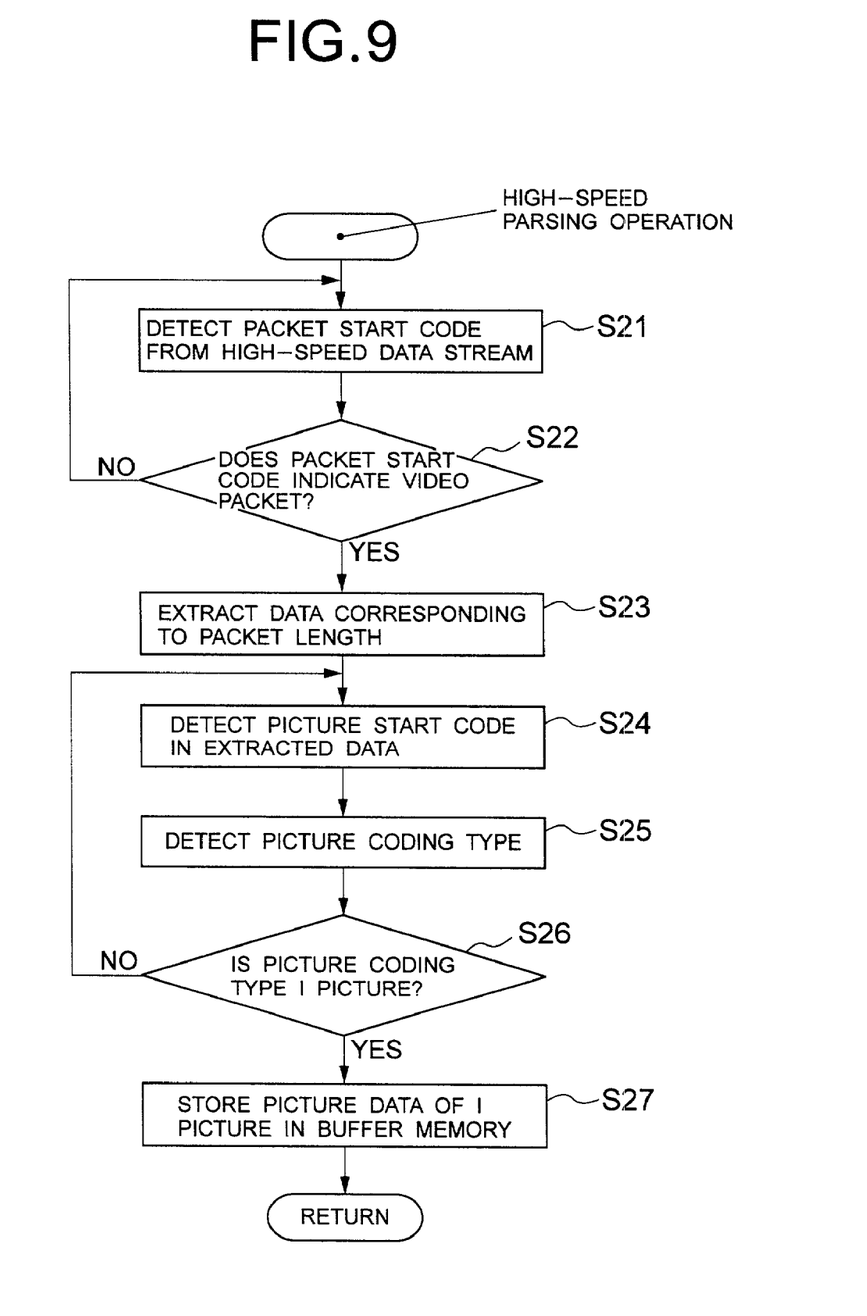
FIG. 9 is a flowchart of the operation of a high-speed parser.

The operation of the high-speed parser 5 in step S11 will be described in detail. As shown in FIG. 9, the high-speed parser 5 detects a packet start code in the high-speed data stream (step S21), and then discriminates whether or not the packet start code detected in step S21 indicates video (step S22). If the packet start code is not for video, the procedure goes back to step S21 and repeats the above operation. If the packet start code is for video, data corresponding to the packet length are fetched from the high-speed data stream (step S23). The picture start code is detected in the fetched data (step S24). After the picture start code is found, the picture coding type is detected (step S25). As shown in FIG. 2F, the picture start code is arranged at the head of each picture. In the case, a picture start code that equals 00000100 in hexadecimal is detected. The picture coding type is arranged after the picture start code so as to indicate the encoding mode of the picture.

The high-speed parser 5 discriminates whether or not the picture coding type detected in step S25 is 001 in binary, which indicates an I picture type (step S26). If it is not for the I picture type, the procedure goes back to step S24 and repeats the above operation. If it is for the I picture type, the high-speed parser 5 causes the picture data of I picture to be stored in the buffer memory 4 (step S27).

Pieces of picture data in the buffer memory 4 are supplied to the low-speed watermark detector 6 (step S12).

The low-speed watermark detector 6 detects the desired watermark on the basis of the supplied picture data of I picture (step S13) and outputs a result of the detection (step S14). The watermark detection processing performed by the low-speed watermark detector 6 is the same as that of the low-speed watermark detector 3.

In the watermark information detecting apparatus in FIG. 7, only picture data are stored in the buffer memory 4 by using the high-speed parser 5. Consequently, the capacity of the buffer memory 4 can be made smaller than that of the buffer memory 1 of FIG. 1.

Each of the above embodiments is explained in the case where a high-speed data stream of the MPEG system is the high-speed data stream in which a digital watermark is detected. However, the present invention is also applicable to the case where the high-speed data stream is in another data format.

In the embodiments mentioned above, the picture data of I picture is extracted into the buffer memory for the detection of the watermark. It is also possible to extract B and P pictures, restore one screen image and detect the watermark therefrom. In short, some amount of data which surely contains specific information such as a watermark must extracted into the buffer memory, and then the specific information should be detected by a low-speed detector.

As described above, according to the present invention, specific information such as a digital watermark can be surely detected from a high-speed data stream by using a low-speed analysis detector instead of a high-speed analysis detector. Therefore, the information detecting apparatus can be configured at low cost.

This application is based on a Japanese Application No. 2000-140290 which is hereby incorporated by reference.

What is claimed is:

1. A watermark detecting apparatus comprising:

an extractor for extracting picture data of I picture including a watermark from a high-speed data stream of an MPEG format; and a detector for detecting at low speed the watermark in the picture data extracted by said extractor, wherein said extractor includes a buffer memory for storing data for more than 1 GOP (Group of Pictures) in the high-speed data stream; and a low-speed parser for analyzing and outputting the picture data including the watermark from the data stored in said buffer memory.

* * * * *